Aug. 10, 1926.
W. N. BOOTH
1,595,067
MACHINE FOR MITERING SPOKES
Filed Feb. 27, 1922
5 Sheets-Sheet 4
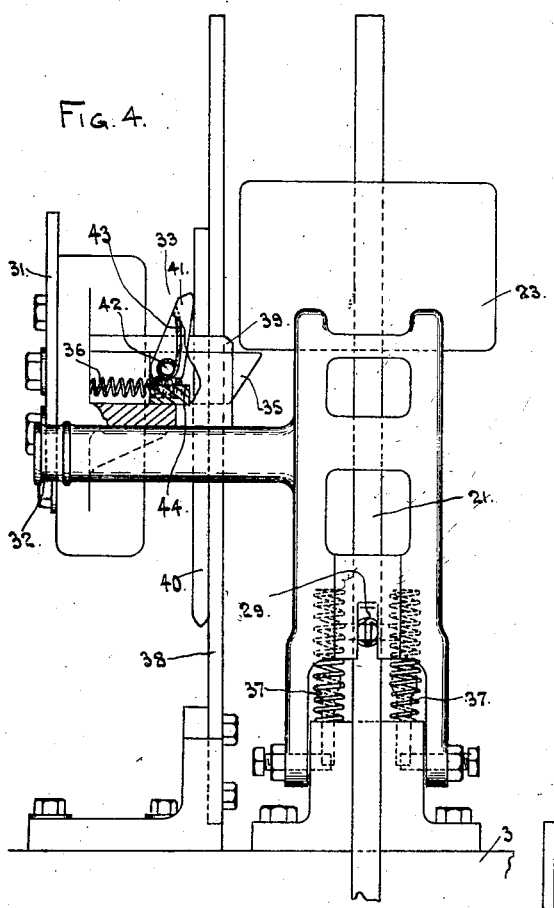
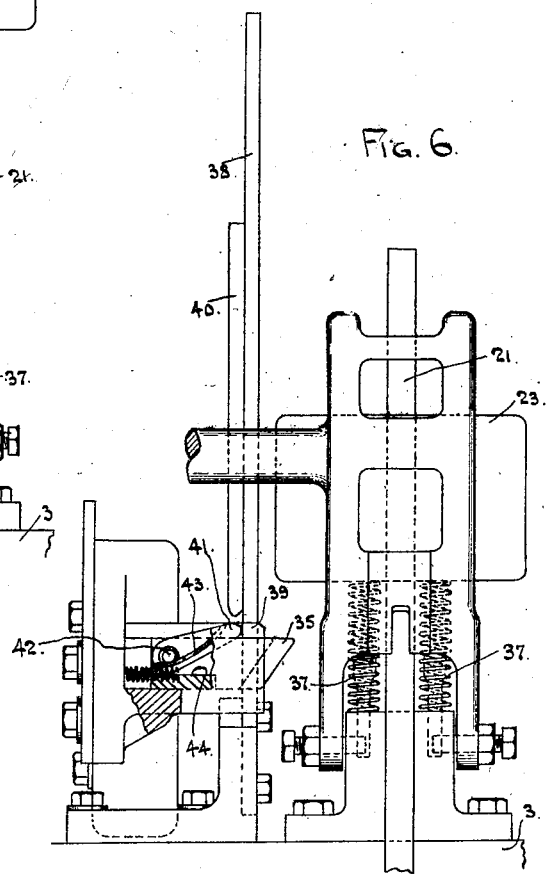
Inventor
WILLIAM N. BOOTH.
Attorneys.

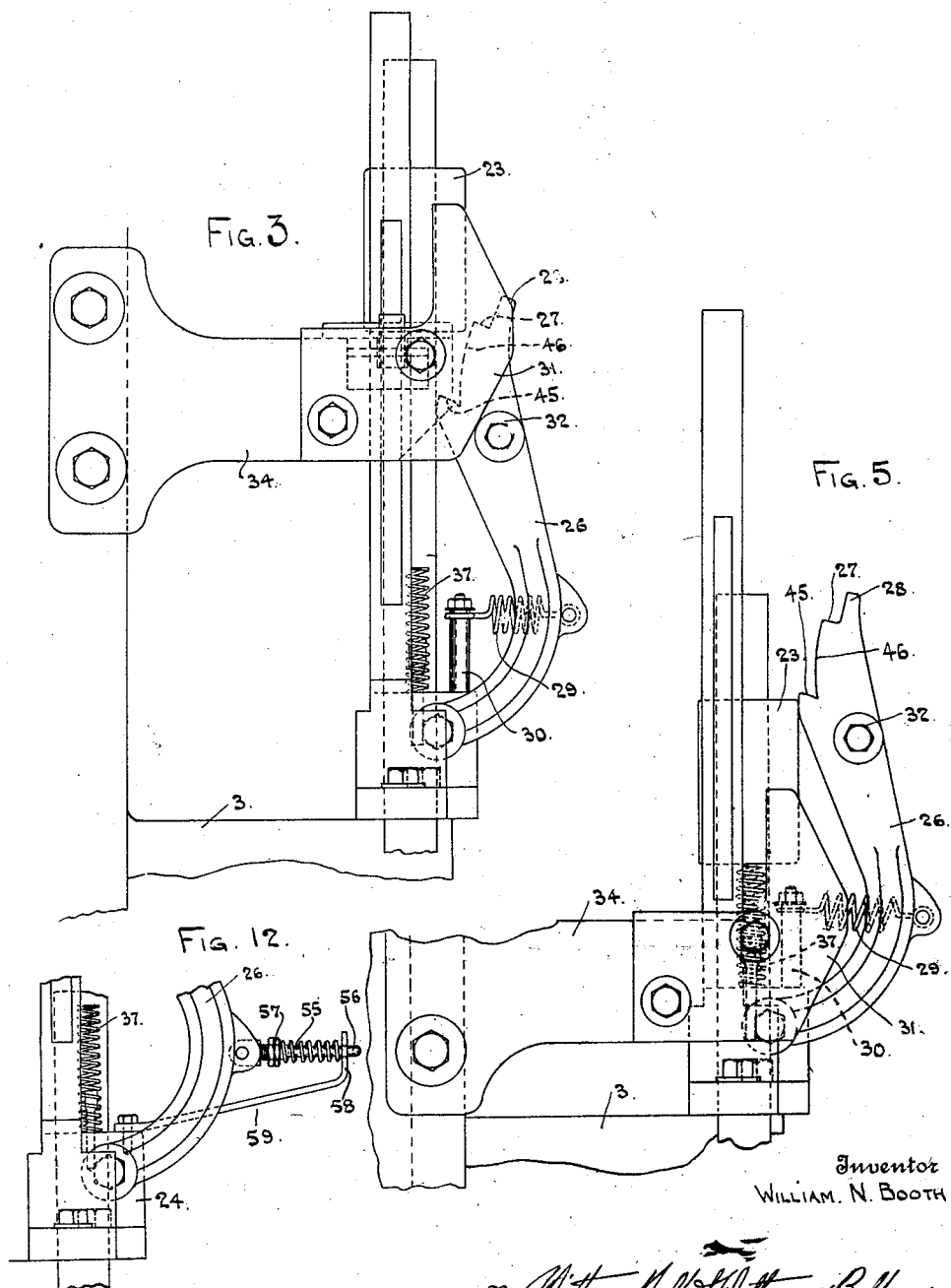

Aug. 10, 1926.
W. N. BOOTH
1,595,067
MACHINE FOR MITERING SPOKES
Filed Feb. 27, 1922    5 Sheets-Sheet 5
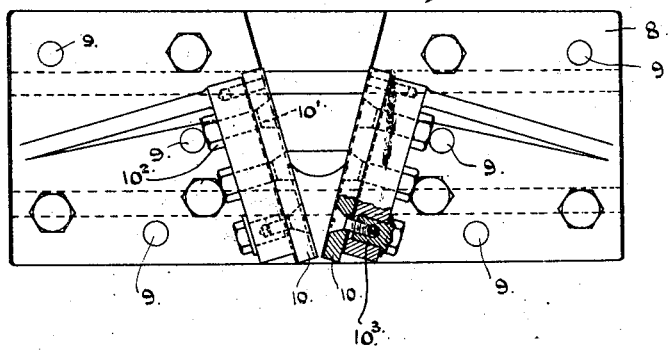
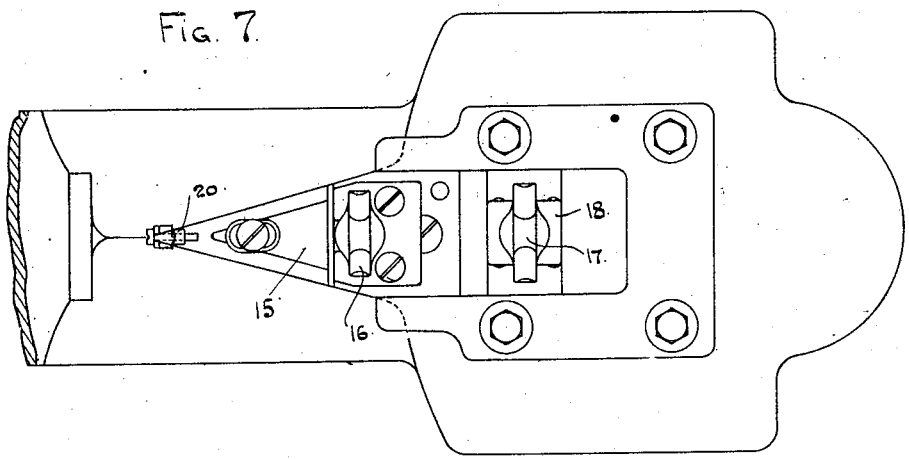
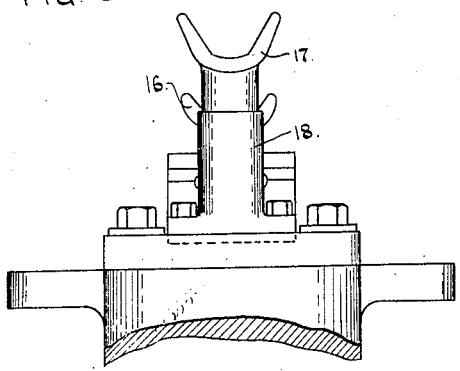
Inventor
WILLIAM. N. BOOTH.
Attorneys Patented Aug. 10, 1926.

1,595,067

UNITED STATES PATENT OFFICE.

WILLIAM N. BOOTH, OF DETROIT, MICHIGAN.

MACHINE FOR MITERING SPOKES.

Application filed February 27, 1922. Serial No. 539,617.

The invention relates to machines for mitering spokes and has for some of its objects the provision of means for positioning the spoke blank prior to the mitering operation; the provision of a mitering tool movable toward and away from the support for a spoke blank, and a member movable toward and away from the support and movable into engagement with the spoke blank upon the support prior to the engagement of the mitering tool with the spoke blank and also movable out of engagement with the spoke blank during the initial movement of the mitering tool away from the spoke blank, whereby the spoke blank may be quickly removed from its support after it has been mitered and replaced by a new spoke blank before the mitering tool has returned into proximity to the support; and the provision of a gravity actuated spoke holding member which moves in timed relation to the mitering tool both toward and away from the support. Another object of the invention resides in the means for holding the spoke holding member stationary relative to the mitering tool after the spoke holding member has been moved away from the support a predetermined distance and until a member movable with the mitering tool comes into engagement with the spoke holding member to carry the same upon movement of the mitering tool toward the support. Further objects of the invention reside in the novel features of construction and combinations and arrangements of parts as more fully hereinafter set forth.

In the drawings:

Figure 1 is a side elevation of a portion of a spoke mitering machine embodying my invention;

Figure 1ᴬ is a sectional side elevation showing a portion of the machine head;

Figures 3 and 4 are respectively a side elevation and a sectional front elevation showing the spoke holding member in positions of adjustment supported by a latch and also showing the rack bracket for moving the spoke holding member just as the former has become disengaged from the latter;

Figures 5 and 6 are respectively views corresponding to Figures 3 and 4 showing the parts in still other positions of adjustment;

Figure 7 is a top plan view of the spoke blank support upon the machine bed;

Figure 8 is a front elevation thereof;

Figure 9 is a bottom plan view of the mitering tool;

Figure 10 is a section through the lower end of the spoke holder;

Figure 11 is a front elevation thereof;

Figure 12 is a side elevation of a modified part of the machine.

Figure 1:
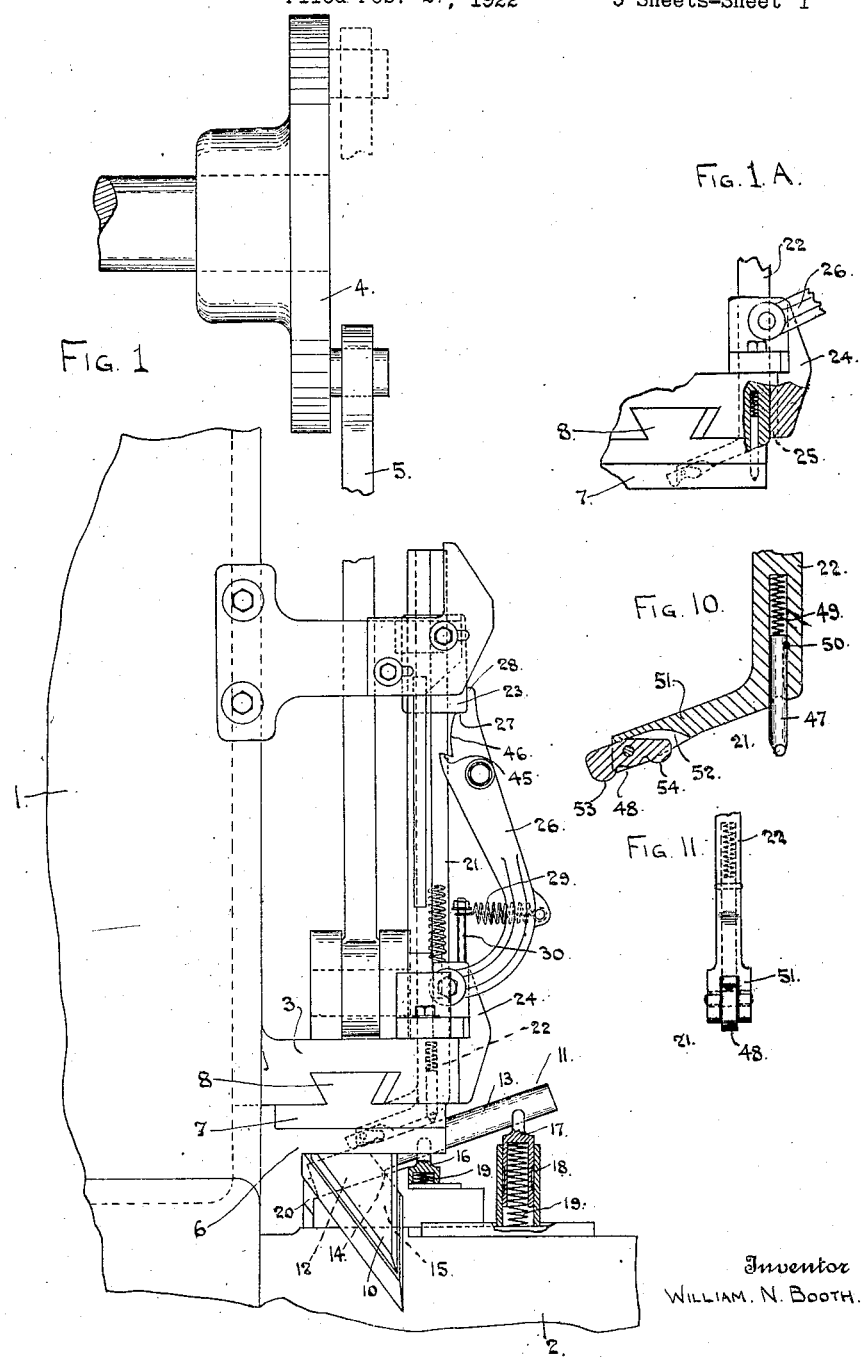

1 is the body of the spoke mitering machine, 2 the machine bed, and 3 the head which is vertically slidably mounted on the body and reciprocated by the crank wheel 4 through the connecting rod 5. 6 is a mitering tool below the head 3 and mounted thereon.

This mitering tool comprises the head block 7 having a dove tailed portion slidably mounted in a dove tailed slot in the lower face of the head and extending transversely thereof whereby the mitering tool may be laterally adjusted. 8 are knife holders mounted upon the lower face of the head block 7 and having but one pre-determined position each thereon which is determined by means of the dowels 9 on the head block which engage in the knife holders. 10 are knives detachably secured to the knife holders at an angle to each other by means of the machine screws 10' and the nuts 10². Since the apex of the space between the blades is not sufficiently wide to withdraw a machine screw located opposite this apex and extending through the knife as well as the flange of the holder, the nut has the interiorly threaded projection 10³ engaging in the flange of the holder and engaged in by the machine screw which has a length such that it may be withdrawn. The head block, knife holders and knives form a unit structure in which the parts cannot be adjusted relative to each other so that it is impossible for a workman to vary the relative angular positions of the knives. This unit may be readily removed from the machine head if desired to permit of sharpening the knives by a grinding machine, which may be readily adjusted since the knives are set at a known angle. Also, this unit is interchangeable with others so that it may be readily replaced without the necessity of stopping the spoke mitering machine for any appreciable length of time. Furthermore, with my construction for detachably securing the knives, they may be readily removed from the holders without the necessity of disassembling the other parts of the unit.

The spoke blank 11, which is adapted to be mitered, has the rectangular portion 12 and the barrel portion 13 which, as shown, is substantially cylindrical, the rectangular and barrel portions being connected by the shoulder 14. The support for this spoke blank comprises the anvil 15 longitudinally adjustably secured upon the machine bed 2 and adapted to be engaged by the rectangular portion 12 of the blank and the support also comprises the bifurcated plungers 16 and 17 at one end of the anvil, having their bifurcations adapted to engage the barrel portion 13 of the blank. These plungers are slidable in guides 18 and are supported by the coil springs 19 so that they normally occupy a position such that when the spoke blank is inserted, the lower face of its rectangular portion does not completely engage the upper face of the anvil. The axes of the plungers are in alignment with the central longitudinal or median line of the anvil so that they will longitudinally center the spoke blank relative to the mitering tool whereby the mitered sides of the rectangular portion of the spoke blank will have the same angle of divergence from the longitudinal center of the spoke blank. 20 is a gage plate at the inner end of the anvil 15 and adapted to engage the inner end of the spoke blank to longitudinally position the latter. This gage plate is secured to the anvil so that upon longitudinal adjustment of the latter, it is also longitudinally adjusted. The upper face of the anvil is flat but inclined downwardly toward the gage plate and the outer bifurcated plunger 17 is of sufficiently greater length than the inner bifurcated plunger 16 to properly engage and assist in positioning the spoke blank.

Figure 2:
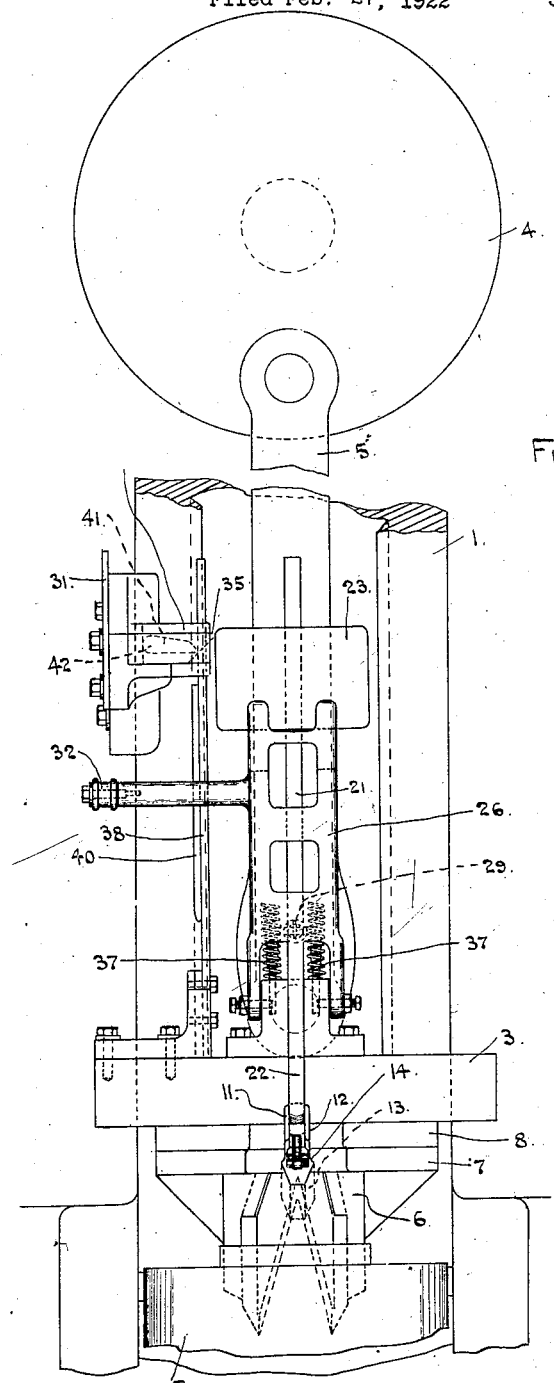
Figure 2 is a front elevation of Figure 1.

To position the spoke blank 11 upon its support so that the lower face of its rectangular portion and also its inner end will properly engage the anvil and gage plate respectively, and to hold this spoke blank upon its support while it is being mitered, there is the spoke holder 21 comprising the slide bar 22 mounted in a vertical slot in the forward edge of the machine head 3 and the weight 23 secured to the upper end of the slide bar. 24 is a fixture secured to the machine head and having the key 25, as shown particularly in Figure 1$^A$ which engages in the vertical slot in the machine head and forms a guide for the front edge of the slide bar. 26 is a rack bracket pivotally mounted upon the fixture 24 and provided at its upper end with the lateral shoulder 27 adapted to engage the lower face of the weight 23 after the spoke blank has been mitered and upon initial upward movement of the machine head. 28 is a vertical shoulder extending upwardly above the lateral shoulder 27 for engaging the front face of the weight 23 and preventing inward movement of the upper end of the rack bracket beyond the weight, the upper end being yieldably forced inward by the coil spring 29 connecting an intermediate portion of the rack bracket and a vertical pin or bolt 30 upon the fixture 24. Figures 1 and 2 show the positions of the parts as thus far described when the machine head with the spoke holder in engagement with the spoke blank and the mitering tool at the bottom of its stroke is about to move upwardly.

As shown in Figures 3 and 4, the machine head, with the mitering tool, and the spoke holder have been moved upwardly to permit of the disengagement of the spoke blank 11 from its support and the insertion of a new spoke blank. However, in order to provide for the engagement of the spoke holder with the spoke blank prior to the engagement of the knives of the mitering tool with the spoke blank, it is necessary to secure relative upward movement of the machine head and mitering tool relative to the spoke holder. This is accomplished by means of the cam 31 mounted upon the frame 1 of the machine and adapted to engage the roller 32 secured to the rack bracket 26 near its upper end, the arrangement being such that the roller coming into engagement with the cam is moved outwardly and thereby moves the upper end of the rack bracket outwardly and disengages the lateral shoulder 27 from the weight 23. The cam 31 moves the upper end of the rack bracket outwardly a distance such that a second lateral shoulder (which will be referred to) upon the rack bracket and below the lateral shoulder 27 also clears the weight. To hold the spoke holder stationary during further upward movement of the machine head thereby avoiding liability of damaging or breaking the parts by reason of the spoke holder dropping, there is the latch 33 also mounted upon the machine frame by the same bracket 34 which supports the cam 31. This latch has the plunger 35 yieldably forced outwardly into the path of the weight 23 by means of the coil spring 36, this latch being so positioned that the plunger will engage under the lower face of the weight just prior to the disengagement of the rack bracket from the weight.

Further upward movement of the machine head with the mitering tool moves the rack bracket 26 upwardly to slide over the front face of the weight 23, and in addition, brings the coil springs 37 mounted upon the upper face of the fixture 24 into engagement with the weight 23 to thereby carry the spoke holder as shown particularly in Figures 5 and 6. To remove the plunger 35 from the path of travel of the weight 23 upon its downward movement, there is the vertical trip bar 38 mounted upon the machine head 3 and guided by the latch housing 39. This trip bar has the key or projection 40, the lower end of which at the time the machine head is at the upper end of its stroke, is positioned slightly above the latch and below the plane of the lower face of the weight. Upon initial downward movement of the machine head, the lower end of the trip bar key 40 comes into engagement with the dog 41 pivotally connected at 42 to the plunger 35 and yieldably forced in a clockwise direction by a spring 43. Since the forward end of the dog 41 is in engagement with the trip bar below the trip bar key, downward movement of the trip bar key first forces the clockwise rotation of the dog until its lower side engages the stop 44, thereby compelling slight rearward or inward movement of both the dog and plunger and second, rides over the cammed free end of the dog and compels further rearward or inward movement of both the dog and plunger to a position shown by dotted lines in Figure 6, this movement being sufficient to force the end of the latch 33 out of the path of the weight 23 and to permit of downward movement of the weight 23 carried by the coil springs 37 as the machine head continues to move downwardly. With this arrangement, the lower end of the spoke holder which is bent inwardly, comes into engagement with the rectangular end portion of the spoke blank prior to the engagement of the knives and compels the lower face of the rectangular end portion to completely engage the upper face of the anvil as well as compels the inner end of the spoke blank to engage the gage plate.

In the event that the machine continues in operation and a spoke blank is not inserted, it is necessary to provide means for raising the spoke holder during the initial upward movement of the machine head, which is accomplished by providing a second lateral shoulder 45 near the outer end of the rack bracket 26 and inwardly and below the lateral shoulder 27, the vertical distance between the shoulders 27 and 45 being slightly greater than the thickness of the spoke blank rectangular portion. As a consequence of this arrangement upon downward movement of the machine head, the spoke holder comes into engagement with the anvil and the rack bracket continues to move downwardly, sliding over the outer face of the weight 23 of the spoke holder until the lower lateral shoulder 45 passes below the weight and is moved inwardly by means of the coil spring 29 to bring the vertical shoulder 46 connecting the lateral shoulder into engagement with the front face of the weight. Then upon upward movement of the machine head, the spoke holder is raised.

To accurately position the spoke blank 11 upon its support so that the lower face of its rectangular portion will positively engage the upper face of the anvil, the slide bar 22 of the spoke holder has at its lower end the spring pressed plunger 47 and the pivoted dog 48. The plunger 47 extends longitudinally of the slide bar 22 and out through its lower end to engage the spoke blank directly in line with the slide bar and between the bifurcated plungers 16 and 17. 49 is a coil spring within the slide bar for yieldably forcing the plunger 47 downwardly, the downward movement of this plunger being limited by the transverse pin 50 in the slide bar engaging the upper end of a slot in the side of the plunger. The slide bar has the laterally extending portion or foot 51 which terminates above the anvil and in the end of which is pivoted the dog 48, this end being preferably provided with a groove 52 into which the dog extends. The dog has on opposite sides of its pivot the bearing faces 53 and 54 which are adapted to engage the rectangular portion of the spoke blank to evenly force its lower face into positive parallelism with the upper face of the anvil.

As shown in the modification in Figure 12, the rack bracket 26 is yieldably forced inward by the coil spring 55 in front of the rack bracket and surrounding the pin 56 pivoted to the rack bracket. This spring abuts at one end, the nut 57 upon the pin adjacent to the rack bracket, and abuts at its other end the upwardly extending portion 58 of the bracket 59 extending between the bifurcations at the lower end of the rack bracket and secured to the fixture 24, the upwardly extending portion of this bracket being slidably engaged in by the outer or forward end of the pin 56.

From the above description, it will be readily seen that I have provided a construction of spoke mitering machine in which means is provided for accurately positioning and holding a spoke blank in position during the mitering operation, this positioning and holding means coming into operation slightly prior to the engagement of the mitering tool. Furthermore, the means for clamping the spoke holding blank upon its support during the mitering operation, is moved upwardly during the initial upward movement of the mitering tool so that sufficient clearance is quickly secured for removing the mitered spoke blank and inserting another spoke blank. Furthermore, I have provided means for holding the spoke holder stationary after it has been moved upwardly a predetermined distance and until the member movable with the machine head and adapted to carry the spoke holder during the downward movement of the machine head comes into engagement with the spoke holder whereby damaging or breaking of the parts of the machine is avoided. Still another feature is that I have provided means for raising the spoke holder during the initial upward movement of the mitering tool irrespective of whether a spoke blank has or has not been mitered.

Another feature is that I have produced a design that eliminates the necessity of numerous and inter-dependable adjustments. By means of adjustment of only two pieces the machine can be quickly and accurately set for any class of work within its range, and the rugged nature of these parts will not allow the jars and shocks of the machine in operation to change their relative positions.

What I claim as my invention is:

1. In a spoke mitering machine, the combination with a support for a spoke blank, of a reciprocable member for cutting the spoke blank, movable toward and away from the same, a member for holding the spoke blank upon said support, carried by said cutting member during a portion of its travel toward the spoke blank and movable into engagement with the spoke blank prior to the engagement of said cutting member with the spoke blank, means carried by said cutting member for moving said holding member away from the spoke blank during the initial movement of said cutting member away from the spoke blank, said means being disengageable from said holding member at a predetermined point in the travel of said cutting member away from the spoke blank, and means for supporting said holding member when said last-mentioned means has become disengaged from said holding member and until said cutting member again carries said holding member.

2. In a spoke mitering machine, the combination with a support for a spoke blank, of a vertically reciprocable member for cutting the spoke blank movable downwardly into engagement with and upwardly out of engagement with the spoke blank, a gravity actuated member for holding the spoke blank upon said support, means upon said cutting member for carrying said holding member during the downward movement of said cutting member and permitting of the engagement of said holding member with the spoke blank prior to the engagement of said cutting member with the spoke blank, means upon said cutting member for moving said holding member away from the spoke blank during the initial upward movement of said cutting member, said last-mentioned means being disengageable from said holding member at a predetermined position in the upward movement of said cutting member, and means engageable with said holding member prior to the disengagement of said last-mentioned means from said holding member for supporting the same until engaged by said carrying means upon said cutting member.

3. In a spoke mitering machine, the combination with a support for a spoke blank, of a vertically reciprocable head movable downwardly toward and upwardly away from the support, a member upon said head for cutting the spoke blank, a gravity actuated member for holding the spoke blank, said holding member being movable into engagement with the spoke blank prior to the engagement of said cutting member with the spoke blank, means upon said head for carrying said holding member during the downward movement of said head, a rack bracket upon said head for moving said holding member upwardly during the initial upward movement of said head, means for disengaging said rack bracket from said holding member at a predetermined point in the upward movement of said head, a latch for supporting said holding member until engaged by said carrying means upon said head, said latch being engageable with said holding member prior to the disengagement of said rack bracket, and means upon said head for disengaging said latch after the engagement of said head carrying means with said holding member.

4. In a spoke mitering machine, the combination with a support for the spoke blank, of a head movable downwardly toward and upwardly away from said support, a spoke blank mitering tool mounted upon said head, a gravity actuated member for holding the spoke blank upon said support, said holding member being movable into engagement with the spoke blank prior to the engagement of said mitering tool, a support upon said head for carrying said holding member during the downward movement of said head, a rack bar pivoted upon said head for moving said holding member upwardly during the initial upward movement of said head, a cam for disengaging said rack bracket from said holding member at a predetermined point in the upward travel of said head, a latch having a plunger engageable with said holding member prior to disengagement of said rack bracket therefrom and until said support upon said head comes into engagement with said holding member, and a trip bar carried upon said head and provided with means for withdrawing said plunger from the path of travel of said holding member after engagement of said support upon said head with said holding member.

5. In a spoke mitering machine, the combination with a support for a spoke blank, of a head movable downwardly toward and upwardly away from said support, a mitering tool engageable with the spoke blank and mounted upon said head, a vertically reciprocable member for holding the spoke blank upon said support, means upon said head for carrying said holding member during the downward movement of said head, a rack bracket upon said head provided with a plurality of shoulders at different heights for engaging said holding member to raise the same away from said support during the initial upward movement of said head, and means for disengaging said rack bracket from said holding member at a predetermined point in the upward travel of said head.

6. In a spoke mitering machine, the combination with a tool for mitering a spoke blank, of a support for the spoke blank comprising a stationary anvil having a flat inclined face, yieldable guide members at one end of said anvil engageable with the spoke blank for longitudinally centering the same relative to said tool, a gage plate at the opposite end of said anvil engageable with an end of the spoke blank, and means engageable with the spoke blank prior to the engagement of said tool therewith for clamping the spoke blank upon said anvil and against said gage plate and compelling the yielding of said guide members.

7. In a spoke mitering machine, the combination with a support for the spoke blank comprising an anvil and a yieldable plunger at one end of said anvil, of a spoke holder engageable with the spoke blank comprising a slide bar having a laterally extending portion, a yieldable plunger extending longitudinally of said slide bar and engageable with the portion of the spoke blank supported by said first-mentioned plunger, and a pivoted dog upon said laterally extending portion of the slide bar engageable with the portion of the spoke blank above said anvil.

8. In a spoke mitering machine, the combination with a support for the spoke blank comprising an anvil and a pair of aligned yieldable plungers at one end of said anvil, of a spoke holder comprising a slide bar having a laterally extending portion, a yieldable plunger extending longitudinally of said slide bar and engageable with the portion of the spoke blank between said pair of first-mentioned plungers, and a pivoted dog upon said laterally extending portion having a pair of faces engageable with the portion of the spoke blank above said anvil.

9. In a spoke mitering machine, the combination with a support for a spoke blank, of a reciprocable member for cutting the spoke blank movable toward and away from the same, a gravity actuated member for holding the spoke blank upon its support movable into engagement with the spoke blank prior to the engagement of said cutting member with the spoke blank, a yieldable member carried by said cutting member during a portion of its movement toward the spoke blank for supporting said holding member during a portion of its movement, and means movable with said cutting member away from the spoke blank for moving said holding member away from the spoke blank during the initial movement of said cutting member away from the spoke blank.

10. In a spoke mitering machine, the combination with a support for a spoke blank, of a reciprocable member for cutting the spoke blank movable toward and away from said support, a member for holding the spoke blank upon said support, means upon said cutting member for carrying said holding member during a portion of the movement of said cutting member toward said support, a member upon said cutting member provided with means for engaging said holding member either when said holding member rests upon the spoke blank or upon said support, and means for disengaging said last-mentioned member from said holding member at a predetermined point in the movement of said cutting member away from said support.

11. In a spoke mitering machine, the combination with a support for a spoke blank, of a reciprocable member for cutting the spoke blank movable toward and away from said support, a reciprocable member for holding the spoke blank upon said support movable into engagement with the spoke blank prior to the engagement of said cutting member with the spoke blank, means upon said cutting member for carrying said holding member during a portion of the movement of said cutting member toward said support, and a member upon said cutting member provided with a plurality of shoulders spaced longitudinally of said last-mentioned member, said shoulders adapted to alternately move said holding member away from said support during the initial movement of said cutting member away from said support.

12. In a spoke mitering machine, the combination with a support for the spoke blank, of a spoke holder engageable with the spoke blank, a yieldable plunger carried by said holder for engaging a portion of the spoke blank, and a pivoted dog carried by said holder also engageable with a portion of the spoke blank.

13. In a spoke mitering machine, the combination with a support for the spoke blank, of a spoke holder engageable with the spoke blank, means upon said holder for engaging a portion of the spoke blank, and a yieldable member upon said holder engageable with another portion of the spoke blank.

In testimony whereof I affix my signature.

WILLIAM N. BOOTH.